United States Patent Office 3,433,772
Patented Mar. 18, 1969

3,433,772
PROCESS FOR PREPARING
POLYBENZIMIDAZOLES
Edward C. Chenevey, North Plainfield, and Anthony B. Conciatori, Chatham, N.J., assignors to Celanese Corporation, a corporation of Delaware
No Drawing. Filed Dec. 30, 1965, Ser. No. 517,797
U.S. Cl. 260—78.4
Int. Cl. C08g 20/32, 51/22
13 Claims

ABSTRACT OF THE DISCLOSURE

An improved process is provided for the production of polybenzimidazoles in which at least the initial portion of the polymerization reaction is conducted in the presence of an inert organic additive present in the liquid state which is capable of inhibiting the formation of foam. The additives utilized in the process may be selected from the group consisting of alkanes, polycarbocyclic hydrocarbons, diaryl ethers, alkyl aryl ethers, and silicone oils.

---

Polybenzimidazoles are a known class of heterocyclic polymers. Their preparation and description are disclosed, for example, in Patents Nos. 2,895,948 and 3,174,947. A particularly interesting subclass of polybenzimidazoles for fiber production consists of recurring units of the formula:

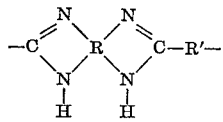

wherein R is a symmetrically tetravalent aromatic nucleus, the adjacent carbon atoms of which pair with nitrogen atoms to form the benzimidazole rings, and R' is an aromatic or alicyclic ring, an alkylene group or a heterocyclic ring. Examples of such heterocyclic rings include those of pyridine, pyrazine, furan, quinoline, thiophene and pyran. Preferred R groups are diphenyl with free valences at the 3,3',4, and 4' positions, i.e.,

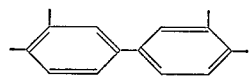

benzene with free valences at the 1,2,4 and 5 positions, i.e.,

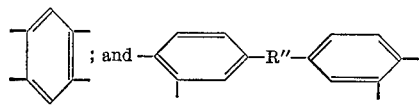

wherein R" is

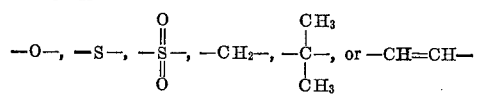

Examples of such polybenzimidazoles include poly-2,2'(m-phenylene)5,5'-bibenzimidazole;
poly-2,2'-(pyridylene-3",5"')-5,5'-bibenzimidazole;
poly-2,2'-(furylene-2",5"')-5,5'-bibenzimidazole;
poly-2,2'-(naphthalene-1",6"')-5,5'-bibenzimidaloze;
poly-2,2'-(naphthalene-1",6"')-5,5'-bibenzimidazole;
poly-2,2'-(biphenylene-4",4"')-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'(m-phenylene)-5,5'-di(benzimidazole)ether;
poly-2,2'-(m-phenylene)-5,5'-di(benzimidazole)sulfide;
poly-2,2'(m-phenylene)-5,5'-di(benzimidazole)sulfone;
poly-2,2'(m-phenylene)-5,5'-di(benzimidazole)methane;
poly-2',2"(m-phenylene)-5',5" di(benzimidazole) propane-2,2 and
poly-2',2"-(m-phenylene)-5',5" di (benzimidazole) ethylene-1,2 where the double bonds of the ethylene groups are intact in the final polymer.

Polybenzimidazoles are characterized by a high degree of thermal stability. They may be shaped to form fibers, films and other shaped articles of wide utility which show great resistance to degradation by heat, hydrolytic media and oxidizing media.

As set forth in U.S. Patent No. 3,174,947, the preferred high molecular weight polybenzimidazoles are prepared by reacting a member of the class consisting of (A) an aromatic compound containing ortho disposed diamino substituents and an aromatic carboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic acid and, (b) the diphenyl ester of a heterocyclic dicarboxylic acid wherein the carboxyl groups are substituents upon carbon in a ring compound from the class consisting of pyridine, pyrazine, furan and quinoline and (c) an anhydride of an aromatic dicarboxylic acid. It should be noted that the "aromatic compound" mentioned in the foregoing descriptions of (A) and (B) may contain a single aromatic ring structure of a plurality or such ring structures, e.g. two such structures separated by an ether, sulfide, sulfone, alkylidene or alkylene group to yield the foregoing polymer structures.

According to the prior art process for preparing aromatic polybenzimidazoles, as described in U.S. Patent No. 3,174,947 and in Vogel et al., J. Polymer Science, volume 50, pp. 511–539 (1961), a two stage process is employed. The monomers are charged to a reactor and heated from 200 to 300° C. under a pressure of less than 0.5 mm. Hg. The foaming melt polymerized product is then cooled, finely powdered and recharged to a reactor, followed by heating at a temperature of at least 250° C. and a pressure of less than 0.7 mm. whereby the final solid state condensation occurs. This process may be modified by replacing the vacuum conditions by a flow of substantially oxygen-free nitrogen through the reactor at atmospheric pressure, as disclosed in application Ser. No. 517,854 filed Dec. 30, 1965 by applicants.

While the foregoing process has been found to be generally effective for many purposes, it has even been found that the foaming polymer which forms in the first stage of the reaction fills an undesirable large volume necessitating a much larger volume than would otherwise be necessary. Moreover, this large volume of foam presents handling difficulties since it must be cooled and the solid polymer foam pulverized prior to the second stage of the reaction.

It is an object of this invention to provide a polymerization process for the production of aromatic fiber-forming polybenzimidazoles in which a reduced volume of foam is formed during the first part of the reaction. It is a further object of this invention to provide a polymerization process for the production of aromatic polybenzimidazoles in which a smaller reactor may be employed and which involves fewer handling difficulties. Other objects will be apparent from the following detailed description and claims.

In accordance with this invention, the foregoing type of polymerization reaction is carried out in the presence of an inert organic additive which exists in liquid state for at least an initial part of the polymerization reaction.

Preferably the organic additive exists in the liquid state at a temperature of 190 to 320° C. and most suitably the additive has an atmospheric boiling point within this temperature range to ensure that the additive is evaporated during the latter part of the polymerization reaction and thus prevent its presence in the polymer as an impurity. Alternatively the additive may have a boiling point higher than this range and if necessary the polymer may be later washed or solvent extracted to remove that portion of the additive which has remained unevaporated.

Classes of high boiling compounds which may be used as the additive are alkanes having, for example, 11 to 18 carbon atoms, e.g. n-dodecane, n-tridecane, n-tetradecane, n-pentadecane, n-hexadecane (cetane) and n-heptadecane, uncondensed and condensed polycarbocyclic hydrocarbons which may be aromatic or alicyclic, e.g. diphenyl, Decalin (decahydronaphthalene), Tetralin (tetrahydronaphthalene) and naphthalene, diaryl ethers, e.g. diphenyl ether, and alkyl aryl ethers where the alkyl group has at least 4 carbon atoms, e.g. n-amyl phenyl ether. Less preferred because their boiling points tend to be above 320° C. and their use may thus require a solvent extraction or washing step are the silicone oils, e.g. dialkyl polysiloxanes such as dimethyl polysiloxane.

The organic additive may be used for example in an amount of 5 to 100% based on the total yield of polymer.

The polymerization process may suitably be carried out in 2 stages under a flow of substantially oxygen free nitrogen through the reactor at a rate such that 1 to 200% of the nitrogen volume of the reactor is replaced per minute, with the nitrogen added at room temperature or preheated to reactor temperature.

The first stage of the reaction results in a foamed polymer of low inherent viscosity and lower gross volume than heretofore, which is then cooled, pulverized and subjected to the second stage of reaction at a higher temperature. The characterization of the nitrogen employed as "substantially oxygen free" indicates that it contains no more than about 20 p.p.m. of oxygen. The nitrogen pressure in the reaction zone during both stages of the reaction is preferably in the range of 0.5 to 2 atmospheres and most suitably about one atmosphere.

The first stage of the reaction is generally carried out at a temperature of at least 250° C., preferably 270 to 300° C., for a period of at least 0.5 hour, preferably 1 to 3 hours, while the second stage of the reaction is carried out at a temperature of at least 325° C., preferably 350 to 425° C. for a period of at least 0.5 hour, preferably 1 to 4 hours.

The pulverization of the cooled, foamed, first stage polymer prior to the second stage of the reaction allows for better heat transfer during the latter stage, since heat transfer to a material having a foamed structure is generally poor. However, since the volume of the foam is greatly reduced by the process of this invention resulting in much-improved heat transfer to the polymer, it is possible to carry out the polymerization process in a single stage, i.e. without the necessity of cooling and pulverizing the foamed polymer between stages. In this case, the other conditions of the process set out previously, e.g. of nitrogen flow temperature, pressure and time, would still apply.

The following examples further illustrate the invention.

Example I

Stoichiometric quantities of pure 3,3'-diaminobenzidine (54 grams) and diphenylisophthalate (80 grams) and 26 grams of cetane are charged to a two gallon electrically heated stainless steel reactor freed of all air by purging several times with deoxygenated nitrogen followed by a constant flow of 1–2 standard cubic feet per hour of nitrogen through the reactor in which a pressure of about one atmosphere is maintained. The reactor is heated to 290° C. in about 2 hours. At about 260° C., phenol and water are evolved. When the mass becomes exceedingly viscous, agitation is stopped and heating at 290° C. is continued for 90 minutes to conclude the first stage of the reaction.

The polymer from the first stage is in the form of a voluminous foam having a gross volume of about 400 ml. This polymer is pulverized and charged to a second, one gallon electrically heated agitated reactor. The vapor space of this reactor is likewise purged several times with deoxygenated nitrogen and a constant flow of about 1.0 standard cubic feet of such nitrogen is maintained through the reactor during the entire second stage of the reaction, which is also carried out at about one atmosphere of pressure. The batch is gradually heated to 385° C. and kept at that temperature for three hours to conclude the second stage of the reaction.

The final poly 2,2' (m-phenylene)5,5' bibenzimidazole is found to have an inherent viscosity of 1.10.

Example II

The procedure of Example I was repeated except that 54 grams of diphenyl was added to the initial reactants instead of cetane. The first stage of the reaction resulted in a foamed polymer having a gross volume of about 400 ml. and an inherent viscosity of 0.24. The inherent viscosity of the final polymer was 1.02.

Example III

The procedure of Example II was repeated except that the amount of diphenyl employed was 135 grams. The gross volume of the first stage polymer was only 100 ml. and the inherent viscosity of the final polymer was 0.60.

Example IV

The procedure of Example I was repeated except that the additive employed was 54 grams of diphenyl ether. The gross volume of the first stage polymer was 1000 ml. and the final polymer had an inherent viscosity of 0.90.

Example V

The procedure of Example I was repeated except that the additive employed was 54 grams of "Decalin" (decahydronaphthalene). The gross volume of the first stage polymer was 1500 ml. and its inherent viscosity was 0.21. The inherent viscosity of the final polymer was 0.90.

To illustrate the advantages of the process of the invention, the procedure of Example I to V was carried out except that no additive at all was employed. The gross volume of the first stage polymer was 2000 ml., considerably higher than that obtained in any of the examples in which an additive was employed.

The inherent viscosities given above were determined from a solution of 0.4 gram of polymer in 100 ml. of 97% $H_2SO_4$ at 25° C.

The polymers of this invention may be dissolved in a suitable solvent, e.g. dimethyl acetamide, dimethyl formamide, or dimethyl sulfoxide, to form a spinning solution which may be dry spun into filaments. After suitable after-treatments such as drawing and heating, the filaments may be knitted or woven into fabrics having excellent high temperature properties. Such fabrics are thus useful in applications such as space suits, parachutes etc.

Many variants of the process will be apparent to one skilled in the art within the spirit of the present invention.

The embodiments of the invention in which an exclusive property or privilege is claimed are defined as follows:

1. In a process for the production of polybenzimidazoles comprising polymerizing at a temperature of at least 200° C. a member of the class consisting of:
   (A) an aromatic compound containing ortho disposed diamino substituents and a phenyl-carboxylate ester substituent, and
   (B) a mixture of
      (1) an aromatic compound containing a pair of ortho-diamino substituents on the aromatic nucleus, and
(2) a member of the class consisting of
   (a) the diphenyl ester of an aromatic dicarboxylic acid, and
   (b) the diphenyl ester of a heterocyclic dicarboxylic acid wherein the carboxyl groups are substituents upon carbon in a ring compound from the class consisting of pyridine, pyrazine, furan and quinoline, and
   (c) an anhydride of an aromatic dicarboxylic acid, the improvement which comprises;
      conducting at least the initial part of the polymerization reaction in the presence of an inert organic additive present in the liquid state which is capable of inhibiting the formation of foam, said inert organic additive having an atmospheric boiling point in the range of 190–320° C. and being used in an amount of 5 to 100% based on the weight of the polymer product.

2. A process according to claim 1 wherein said inert organic additive is selected from the group consisting of alkanes, polycarbocyclic hydrocarbons, diaryl ethers, alkyl aryl ethers, and silicone oils.

3. A process according to claim 1 wherein said inert organic additive in cetane.

4. A process according to claim 1 wherein said inert organic additive is diphenyl.

5. A process according to claim 1 wherein said inert organic additive is diphenyl ether.

6. A process according to claim 1 wherein said inert organic additive is decahydronaphthalene.

7. In a process for the production of polybenzimidazoles comprising (I) melt polymerizing at a temperature of at least 200° C. a member of the class consisting of:
(A) an aromatic compound containing ortho disposed diamino substituents and a phenyl-carboxylate ester substituent, and
(B) a mixture of
   (1) an aromatic compound containing a pair of ortho-diamino substituents on the aromatic nucleus, and
   (2) a member of the class consisting of
      (a) the diphenyl ester of an aromatic dicarboxylic acid, and
      (b) the diphenyl ester of a heterocyclic dicarboxylic acid wherein the carboxyl groups are substituents upon carbon in a ring compound from the class consisting of pyridine, pyrazine, furan and quinoline, and
      (c) an anhydride of an aromatic dicarboxylic acid, pulverizing the product of the melt polymerization, and (II) solid state polymerizing the pulverized product of the melt polymerization at a temperature of at least 250° C., the improvement which comprises;
         conducting at least the initial part of the melt polymerization reaction in the present of an inert organic additive present in the liquid state which is capable of inhibiting the formation of foam selected from the group consisting of alkanes, polycarbocyclic hydrocarbons, diaryl ethers, alkyl aryl ethers, and silicone oils.

8. A process according to claim 7 wherein said inert organic additive has an atmospheric boiling point in the range of 190 to 320° C. and is used in an amount of 5 to 100% based on the weight of the polymer product.

9. A process according to claim 7 wherein said inert organic additive is cetane.

10. A process according to claim 7 wherein said inert organic additive is diphenyl.

11. A process according to claim 7 wherein said inert organic additive is diphenyl ether.

12. A process according to claim 7 wherein said inert organic additive is decahydronaphthalene.

13. A process according to claim 7 wherein the melt polymerization step is conducted at a temperature of 270 to 300° C., and the solid state polymerization step is conducted at a temperature of 350 to 425° C.

References Cited
UNITED STATES PATENTS

Re. 26,065   7/1966   Marvel et al. _____ 260—47

WILLIAM H. SHORT, *Primary Examiner.*

L. L. LEE, *Assistant Examiner.*

U.S. Cl. X.R.

260—2.5, 47

UNITED STATES PATENT OFFICE
CERTIFICATE OF CORRECTION

Patent No. 3,433,772　　　　　　　　　　　　　　　　　　　March 18, 1969

Edward C. Chenevey et al.

It is certified that error appears in the above identified patent and that said Letters Patent are hereby corrected as shown below:

Column 1, line 65, cancel "poly-2,2'-(naphthalene-1",6"),5,5'-bibenzimidazole"; between lines 66 and 67 insert -- poly-2,2'-amylene-5,5' bibenzimidazole --. Column 6, line 15, "present of an inert organic additive" should read -- presence of an inert organic additive --.

Signed and sealed this 31st day of March 1970.

(SEAL)
Attest:

Edward M. Fletcher, Jr.　　　　　　　　　　　　WILLIAM E. SCHUYLER, JR.
Attesting Officer　　　　　　　　　　　　　　　　Commissioner of Patents